(12) United States Patent
Tengler et al.

(10) Patent No.: US 7,606,662 B2
(45) Date of Patent: Oct. 20, 2009

(54) TRAFFIC NAVIGATION SYSTEM

(75) Inventors: Steve Tengler, Grosse Pointe Park, MI (US); Anthony Baehner, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 123 days.

(21) Appl. No.: 11/495,301

(22) Filed: Jul. 31, 2006

(65) Prior Publication Data

US 2008/0027636 A1 Jan. 31, 2008

(51) Int. Cl.
*G01C 21/30* (2006.01)
*G01C 21/32* (2006.01)
*G08G 1/123* (2006.01)

(52) U.S. Cl. .................. 701/209; 701/200; 701/202; 701/207; 701/208; 701/210; 340/995.19; 340/995.2; 340/995.21; 340/995.22; 340/995.23

(58) Field of Classification Search .................. 701/204
See application file for complete search history.

(56) References Cited

U.S. PATENT DOCUMENTS

| | | | | |
|---|---|---|---|---|
| 5,933,100 | A * | 8/1999 | Golding | 340/995.13 |
| 6,490,519 | B1 * | 12/2002 | Lapidot et al. | 701/117 |
| 6,859,720 | B2 | 2/2005 | Satoh et al. | |
| 6,900,740 | B2 | 5/2005 | Bloomquist et al. | |
| 6,973,318 | B2 | 12/2005 | Jambhekar et al. | |
| 7,440,842 | B1 * | 10/2008 | Vorona | 701/117 |
| 2004/0249568 | A1 * | 12/2004 | Endo et al. | 701/209 |
| 2008/0004794 | A1 * | 1/2008 | Horvitz | 701/200 |
| 2008/0059057 | A1 * | 3/2008 | Tengler et al. | 701/204 |

OTHER PUBLICATIONS

Draft SAE J2735 Dedicated Short Range Communications (DSRC) Message Set Dictionary; 2006; Society of Automotive Engineers; Warrendale, PA.
Vehicle-Infrastructure Integration (VII); End to End System Architecture; 2003.
Yuka Gomi; Digital Map Data; Ygomi LLC.; Aug. 2001.

* cited by examiner

*Primary Examiner*—Khoi Tran
*Assistant Examiner*—Nicholas Kiswanto
(74) *Attorney, Agent, or Firm*—Global IP Counselors, LLP

(57) ABSTRACT

A vehicle navigation system is provided with a destination input section, a travel route information section, a historical data input section and an expected travel time reporting section. The travel destination input section is provided for entering a destination point. The travel route information section provides at least one potential travel route to the destination point. The historical data input section provides historical time information based on a plurality of actual motorist travel times to navigate various travel routes. The expected travel time reporting section reports to a user an expected travel times based on the historical time information for a potential travel route.

20 Claims, 6 Drawing Sheets

TRAFFIC NAVIGATION SYSTEM

BACKGROUND OF THE INVENTION

1. Field of the Invention

The present invention generally relates to a traffic navigation system. More specifically, the present invention relates to a traffic navigation system configured and arranged to provide expected travel times for a travel route to a user in a vehicle.

2. Background Information

Recently, vehicles are being equipped with a variety of informational systems such as navigation systems, Sirius and XM satellite radio systems, two-way satellite services, built-in cell phones, DVD players and the like. Various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Dedicated short range communications (DSRC) is an emerging technology that has been recently investigated for suitability in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. The important feature of DSRC technology is that the latency time between communications is very low compared to most other technologies that are currently available. Another important feature of DSRC technology is the capability of conducting both point-to-point wireless communications and broadcast wireless messages in a limited broadcast area.

Accordingly, DSRC technology can be used to provide various information from vehicle-to/from-infrastructure, and from vehicle-to-vehicle, such as providing GPS location, vehicle speed and other vehicle Parameter Identifiers (PIDs) including engine speed, engine run time, engine coolant temperature, barometric pressure, etc. When communications are established with one vehicle and the roadside units in close proximity, this information would be communicated to provide a complete understanding of the vehicles in the broadcast area. This information then can be used by the vehicles for both vehicle safety applications and non-safety applications.

Conventional vehicle navigation systems predict a time to travel a certain route based on speed, distance, number of lights etc. However, the conventional vehicle navigation systems do not provide an expected travel time based on actual motorist travel times of motorists that have traveled the route in the recent past. Thus, the conventional vehicle navigation systems do not take into consideration traffic causing conditions such as road construction, time of day or accidents when predicting a travel time.

In view of the above, it will be apparent to those skilled in the art from this disclosure that there exists a need for an improved navigation system that provides an expected travel time for a travel route based on actual motorist travel times of motorists that have traveled the route in the recent past. This invention addresses this need in the art as well as other needs, which will become apparent to those skilled in the art from this disclosure.

SUMMARY OF THE INVENTION

One object of the present invention is to provide a vehicle navigation system that is configured and arranged to more accurately report an expected travel time to a user for a travel route by using actual motorist travel times of motorists that have traveled the route in the recent past in estimating the expected travel time.

In order to achieve the above mentioned object and other objects of the present invention, a vehicle navigation system is provided that basically comprises includes a destination input section, a travel route information section, a historical data input section and an expected travel time reporting section. The destination input section is configured to enter a destination point. The travel route information section is configured to provide at least one potential travel route to the destination point. The historical data input section is configured to provide historical time information based on a plurality of actual motorist travel times to navigate various routes. The expected travel time reporting section is configured to report to a user a plurality of expected travel times based on the historical time information for the potential travel route.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
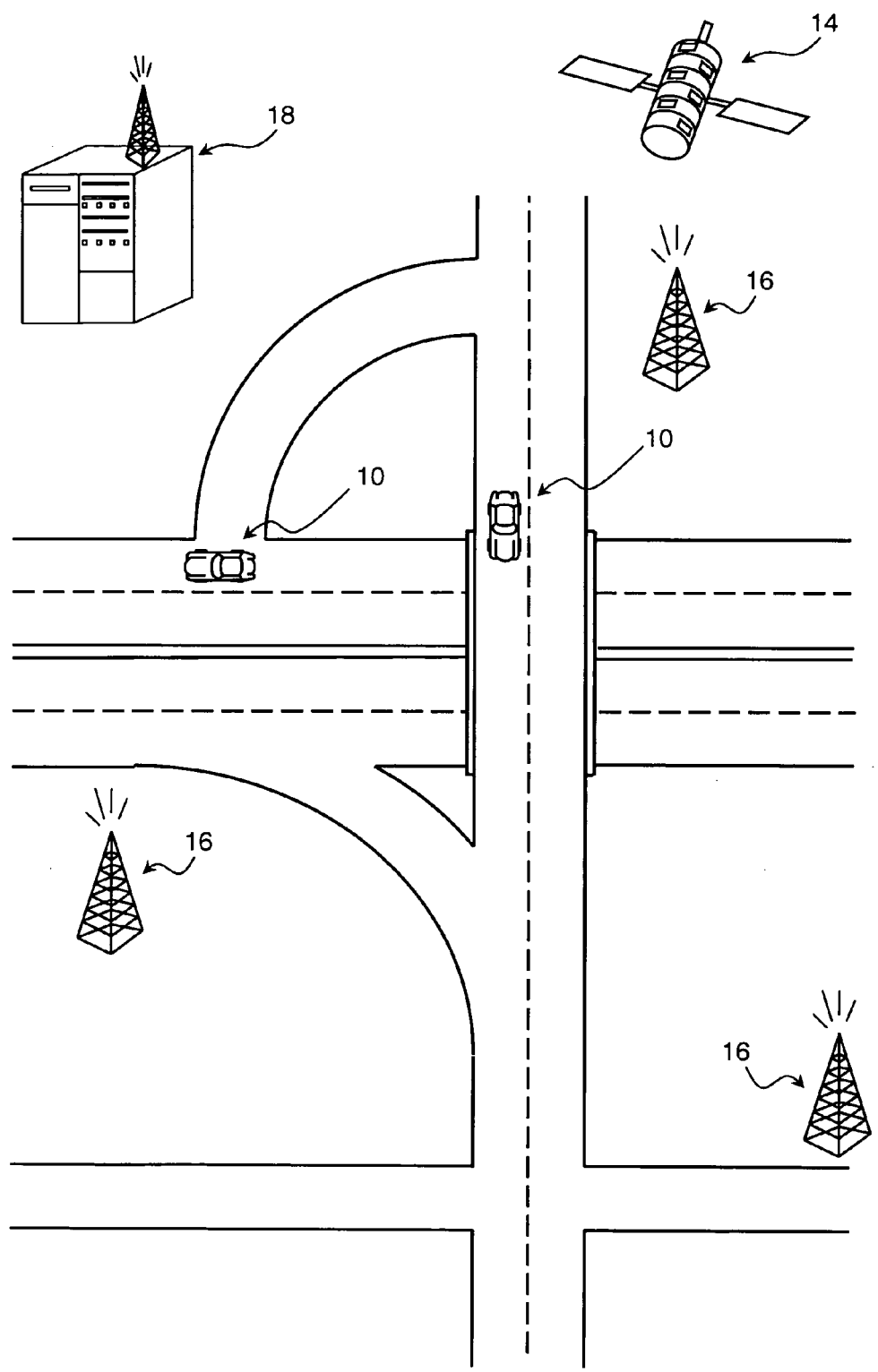
FIG. 1 is a pictorial representation of a two-way wireless communications network showing a pair of vehicles equipped with an on-board unit capable of conducting two-way wireless communications with an external server via a plurality of roadside units in a vehicle navigation system in accordance with the present invention.
Figure 2:
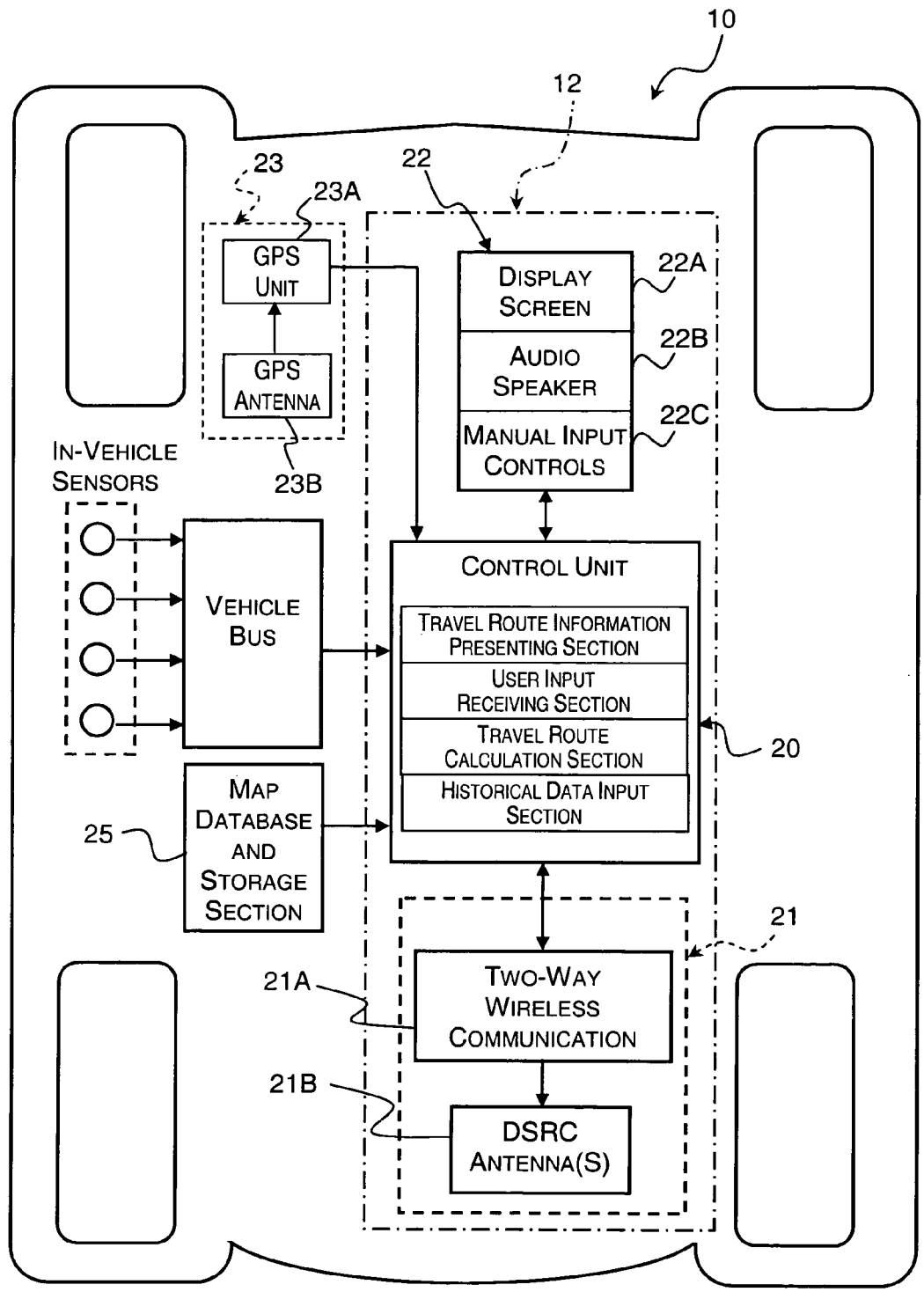
FIG. 2 is a schematic representation of a vehicle that is equipped with the on-board unit for conducting two-way wireless communications in the vehicle navigation system in accordance with the present invention.
Figure 3:
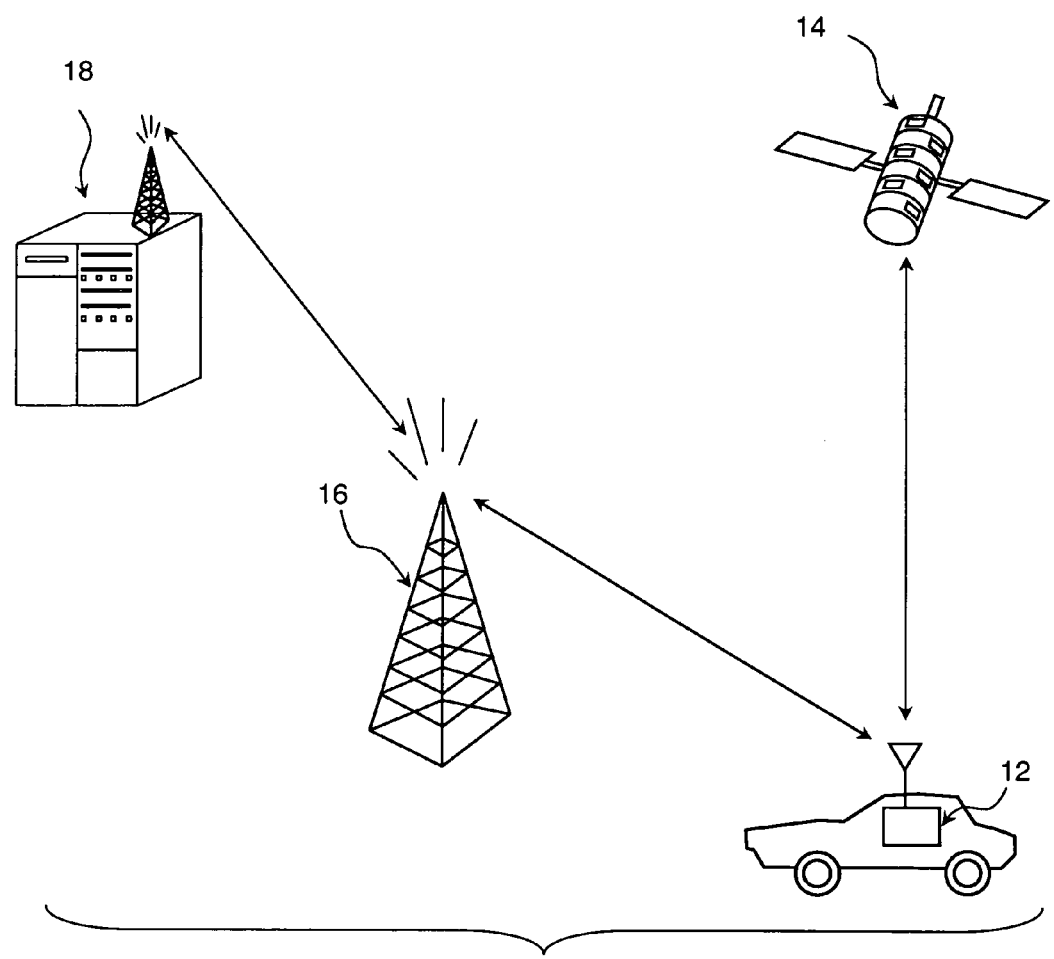
FIG. 3 is a pictorial representation of the two-way wireless communications network showing the vehicle communicating with the external server via the roadside unit in the vehicle navigation system in accordance with the present invention.

Referring initially to FIGS. 1 to 3, a two-way wireless communications network is illustrated that forms a traffic navigation system in accordance with one embodiment of the present invention. In this traffic navigation system, route information and expected travel times are provided to a plurality of host vehicles 10 in response to a route information request. The host vehicles 10 are each equipped with a vehicle on-board unit 12 (vehicle route information display device) in accordance with one embodiment of the present invention. The two-way wireless communications network also preferably includes one or more global positioning satellites 14 (only one shown), one or more roadside units 16 and a base station or external server 18 (route information providing system). As seen in FIG. 3, the external server 18 is configured and arranged to communicate with the vehicle on-board unit 12 to provide the off-board navigation service through wireless communications via the roadside units 16 within the two-way wireless communications network. In particular, the roadside units 16 (two shown) relays signals between the vehicle on-board units 12 of the host vehicles 10 and the external server 18. Thus, the roadside units 16 are configured to send signals to the external server 18 and the vehicle on-board units 12 of the host vehicles 10, and receive signals from the vehicle on-board units 12 of the host vehicles 10 and the external server 18. While the two-way wireless communications network is illustrated as a dedicated short range communications (DSRC) network, it will be apparent to those skilled in the art from this disclosure that other types of two-way wireless communications networks can be used to carry out the present invention. For example, it will be apparent to those skilled in the art from this disclosure that two-way communications such as cellular, Wimax, Wifi, etc can be used as a two-way wireless communications network to carry out the present invention.

The global positioning satellite 14 is a conventional component that is known in the art. Since the global positioning satellite is known in the art, the structures of the global positioning satellite 14 will not be discussed or illustrated in detail herein. Rather, it will be apparent to those skilled in the art from this disclosure that the global positioning satellite 14 can be any type of structure that can be used to carry out the present invention.

The host vehicles 10 are preferably each equipped with a vehicle travel data collection unit so that information can be communicated between the host vehicle 10 and the nearby roadside units 16 within the two-way wireless communications network. More specifically, each of the roadside units 16 is equipped with a DSRC unit for broadcasting and receiving signals to the host vehicles 10 located within a prescribed communication (broadcasting/receiving) region surrounding the roadside unit 16. Moreover, each roadside unit 16 is preferably an IP enabled infrastructure that is configured and arranged to establish a link between the vehicle on-board unit 12 of the host vehicle 10 and an external service provider, such as the external server 18. Since the roadside unit is known in the art, the structures of the roadside units 16 will not be discussed or illustrated in detail herein. Rather, it will be apparent to those skilled in the art from this disclosure that the roadside unit can be any type of structure that can be used to carry out the present invention.

Specifically, in the present invention, the roadside unit 16 is configured and arranged to establish a link between the vehicle on-board unit 12 of the host vehicle 10 and the external server 18. An example is shown in FIG. 2 in which the vehicle on-board unit 12 of the host vehicle 10 establishes a link to the external server 18 via the roadside unit 16 in close proximity to the host vehicle 10. The external server 18 is, for example, a telecommunications provider or a service provider such as the vehicle's manufacturer. The external server 18 functions as a navigation server that provides the off-board dynamic navigation service to the host vehicle 10 through wireless communications. The vehicle on-board unit 12 is configured and arranged to download historical time information based on a plurality of actual motorist travel times through the roadside unit 16. More specifically, upon entering a destination point into the vehicle on-board unit 12, the vehicle on-board unit 12 is configured and arranged to download historical information via the roadside unit 16 based on the actual motorist travel times to navigate various travel routes. The vehicle on-board unit 12 is further configured to update the historical information as the host vehicle 10 travels along a selected route. Thus, as the host vehicle 10 enters a communication area of the roadside unit 16, the updated historical information is downloaded via the roadside unit 16 in proximity to the host vehicle 10.

Referring now to FIG. 2, the vehicle on-board unit 12 of the present invention basically includes a controller or control unit 20, a two-way wireless communication system 21 (constituting both a short range wireless communication section, an information inputting section and a vehicle travel data collection section) and a human-machine interface section 22 (constituting both a user inputting section and a reporting section). The two-way wireless communication system 21 is configured and arranged such that the control unit 20 receives and/or sends various signals to other DSRC equipped component and systems in the communication (broadcasting/receiving) area that surrounds the host vehicle 10. The human-machine interface section 22 includes a screen display 22A, an audio speaker 22B and manual input controls 22C that are operatively coupled to the control unit 20. The control unit 20 is also preferably coupled to a global positioning system 23 (constituting a navigation unit) having a GPS unit 23A and a GPS antenna 23B. Moreover, the control unit 20 of the vehicle on-board unit 12 is configured to receive detection signals from various in-vehicle sensors including, but not limited to, an ignition switch sensor, an accessory switch sensor, a vehicle speed sensor, an acceleration sensor, etc.

The control unit 20 preferably includes a microcomputer with a travel route information display program. The control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communication system 21, the human-machine interface section 22, the global positioning system 23 that are run by the processor(s). The control unit 20 is capable of selectively controlling other DSRC components of the host vehicle 10 such as other safety systems as needed and/or desired. It will be apparent to those skilled in the art from this disclosure that the precise structure and algorithms for the control unit 20 can be any combination of hardware and software that will carry out the functions of the present invention.

The two-way wireless communication system 21 preferably includes communication interface circuitry that connects and exchanges information with a plurality of vehicles that are similarly equipped as well as with the roadside units 16 through a wireless network within the broadcast range of the host vehicle 10. The two-way wireless communication system 21 is preferably configured and arranged to conduct direct two-way communications between vehicles (vehicle-to-vehicle communications) and roadside units (roadside-to-vehicle communications). Moreover, the two-way wireless communication system 21 is preferably configured to periodically broadcast a signal in the broadcast area.

More specifically, as seen in FIG. 2, the two-way wireless communication system 21 is an on-board unit that includes a host vehicle two way communication device 21A and one or more antennas 21B. As mentioned above, the two-way wireless communication system 21 can be any suitable two-way wireless system, e.g., DSRC cellular, Wimax, Wifi, etc. The two way communication device 21A is configured to at least conduct direct short range communications in a host vehicle broadcast area surrounding the host vehicle 10 via the antennas 21B. Preferably, the antennas 21B include both an omnidirectional antenna and a multi-directional antenna. In one preferred embodiment, the two-way wireless communication system 21 is a dedicated short range communication (DSRC) system, since the latency time between communications is very low compared to most other technologies that are currently available. However, other two-way wireless communication systems can be used if they are capable of conducting both point-to-point wireless communications and broadcast wireless messages in a limited broadcast area so long as the latency time between communications is short enough to carry out the present invention. When the two-way wireless communication system 21 is a DSRC system, the two-way wireless communication system 21 will transmit at a 75 Mhz spectrum in a 5.9 GHz band with a data rate of 1 to 54 Mbps, and a maximum range of about 1,000 meters. Preferably, the two-way wireless communication system 21 includes seven (7) non-overlapping channels. The two-way wireless communication system 21 will be assigned a Medium Access Control (MAC) address and/or an IP address so that each vehicle in the network can be individually identified.

Figure 4:
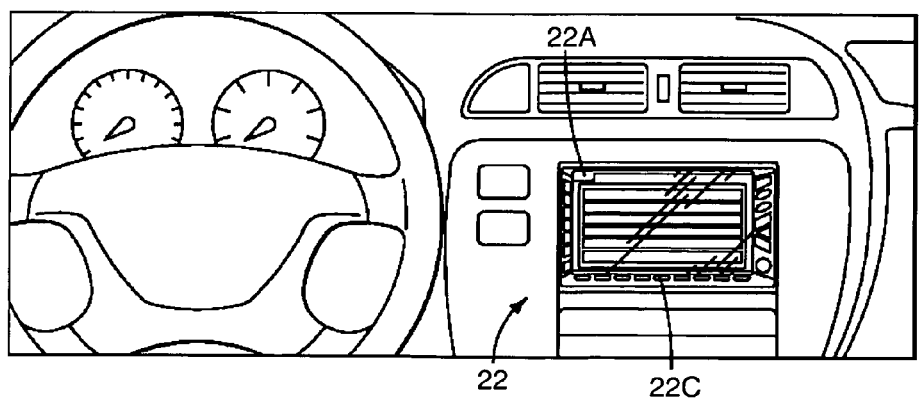
FIG. 4 is an inside elevational view of a portion of the vehicle's interior that is equipped with the on-board unit for conducting two-way wireless communications in the vehicle navigation system in accordance with the present invention.
Figure 6:
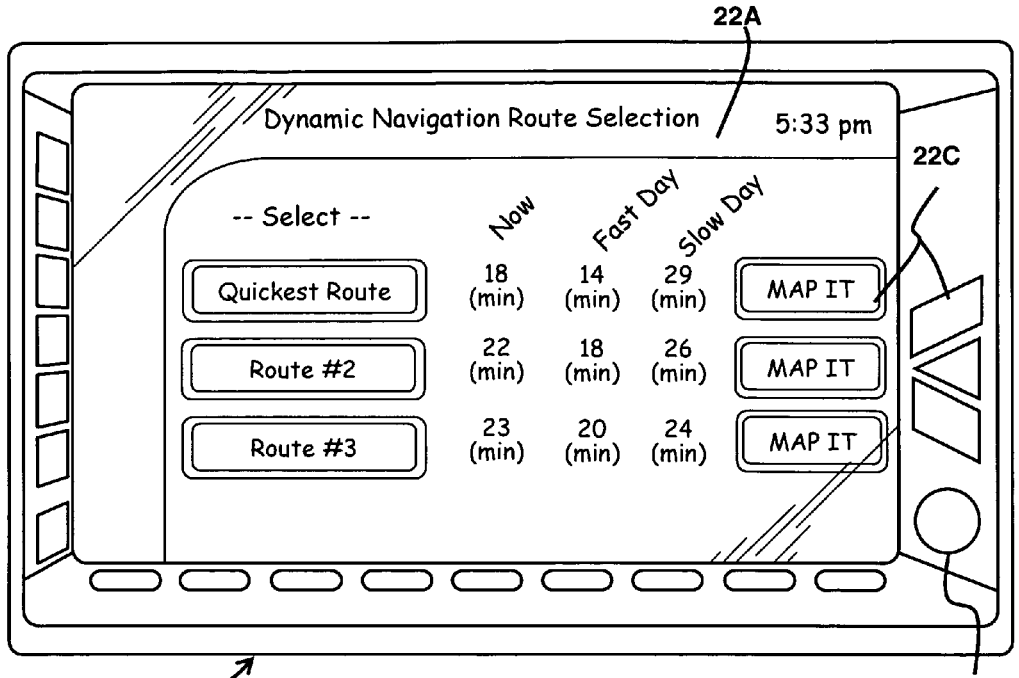
FIG. 6 is a pictorial representation of the "Dynamic Navigation Route Selection" screen display of the human-machine interface section of the on-board unit in accordance with the present invention.

Referring to FIGS. 4 and 6, the human-machine interface section 22 is installed in the host vehicle 10. Specifically, the display unit 22A is configured to display the potential travel routes, and a range of the expected travel times for each of the potential travel routes. The manual input controls 22C are used to input the destination point. It will be apparent to one of skill in the art from this disclosure that the manual input controls 22C do not necessarily require a keypad, touchpad, or the like. Rather, a voice recognition input could be provided so that the user can speak the destination point. Furthermore, the audio speaker 22B can be used to not only confirm receipt of input but also can be used to provide the travel route information and/or the expected travel times.

The global positioning system 23 is a conventional global positioning system (GPS) that is configured and arranged to receive global positioning information of the host vehicle 10 in a conventional manner. Basically, the GPS unit 23A is a receiver for receiving a signal from the global positioning satellite 14 (FIG. 1) via the GPS antenna 22B. The signal transmitted from the global positioning satellite 14 is received at regular intervals (e.g. one second) to detect the present position of the host vehicle 10. The GPS unit 22A preferably has an accuracy of indicting the actual vehicle position within a few meters or less. This data (present position of the host vehicle) is fed to the control unit 20 for processing. Moreover, the GPS data is also transmitted to the external server 18 through wireless communications for the off-board navigation processing.

As mentioned above, in this embodiment of the present invention, the external server 18 functions as a navigation server that provides an off-board dynamic navigation service to the host vehicles 10 through wireless communications. The external server 18 stores a road map data as well as the historical time information or data that can be associated with the road map data. The user of the vehicle on-board unit 12 receives the off-board dynamic navigation service from the external server 18 through the human-machine interface section 22. More specifically, upon the user inputting the desired destination (e.g., address, point of interest, etc.) by operating the input controls 22C of the human-machine interface section 22, the desired destination is sent to the external server 18 through wireless communications as well as a current position of the host vehicle 10 based on the GPS information. The external server 18 calculates a travel route from the current position to the destination position, and sends an initial heading to the vehicle on-board unit 12 of the host vehicle 10. As the host vehicle 10 travels and passes the neighboring roadside unit 16, the vehicle on-board unit 12 receives updated route instructions from the external server 18 based upon the latest external data (e.g., traffic, construction) through the two-way wireless communication system 21. The signals transmitted from the global positioning satellites 14 are utilized to guide the host vehicle 10 through the off-board navigation control executed in the external server 18 in a conventional manner.

As seen in FIG. 2, the control unit 20 is programmed to include functions representing a travel route information presenting section, a user input receiving section, a travel route calculation section and a historical data input section. The travel route information presenting section is configured to present data to the human-machine interface section 22. Specifically, the travel route information presenting section presents the expected travel times for a plurality of available routes to the screen display 22A and/or the audio speaker 22B. Thus, the screen display 22A and/or the audio speaker 22B constitute an expected travel time reporting section that is configured to report to a user a plurality of expected travel times. The user input receiving section is configured to receive data from the human-machine interface section 22. Specifically, the user input receiving section receives information entered into the vehicle on-board unit 12 from the manual input controls 22C. Thus, the manual input controls 22C constitute a destination input section that is configured to enter a destination point. The travel route calculation section is configured to obtain travel route information from the global positioning system 23 and a map database and storage section 25. The historical data input section communicates with the host vehicle two way communication device 21A of the two-way wireless communication system 21 to obtain historical time information based on a plurality of actual motorist travel times to navigate various travel routes.

The roadside units 16 are configured to obtain positions of the host vehicles 10 that are traveling along various routes. The two-way wireless communication system 21 of host vehicles 10 communicates with the roadside units 16 along the travel route. The roadside units 16 are positioned at various distances along different routes. Actual motorist travel times between the roadside units 16 are collected and stored at the external server 18. The external server 18 includes two-way communications configured to receive and store the travel route segment travel data from the roadside units 16. Each of the roadside units 16 covers a communication area that covers various roads. The roads are preferably broken into a plurality of road segments. These road segments are used to form the travel routes contained within the communication area. Thus, the actual motorist travel times for the various road segments are collected by the roadside units 16 and then stored at the external server 18. Thus, the external server 18 is configured to provide historical data for each of the road segments as well as a particular route that is formed of several road segments. The actual motorist travel times of the road segments constitute historical time information or data.

Figure 5:
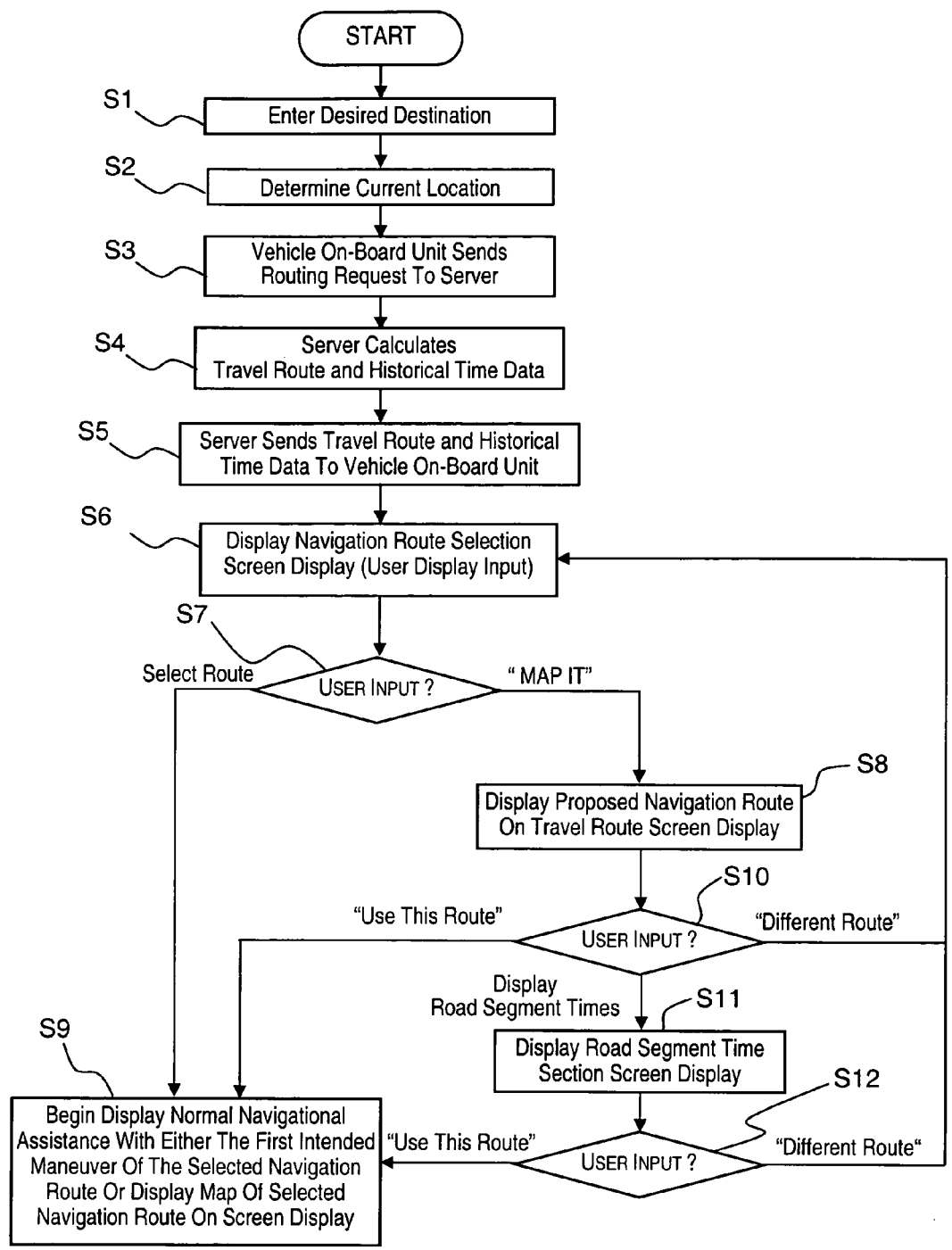
FIG. 5 is a flowchart illustrating a flow of control executed in the on-board unit and the external server of the vehicle navigation system in accordance with the present invention.

Referring now to a flowchart of FIG. 5, a simplified flow chart is illustrated to explain the basic functions that are performed in the vehicle navigation system in accordance with one embodiment of the present invention. In other words, the basic control executed in the external server 18 and the vehicle on-board unit 12 in the vehicle navigation system in accordance with one embodiment of the present invention will be explained. Of course, it will be apparent to those skilled in the art from this disclosure that other options, can be provided to the user in addition to the ones described and illustrated in the embodiment being used to illustrate the basic functions of the present invention.

The user of the vehicle on-board unit 12 first turns on the human-machine interface section 22 and enters a desired destination position (step S1) in a conventional manner. The current location of the host vehicle 10 is preferably determined as a route initialization or starting point based on the GPS information from the GPS system 23 (step S2). However, a route initialization or starting point can be manually entered for the travel route in step S2, if desired and/or needed. The entered destination position and the route initialization point are transmitted to the external server 18 (e.g., DSRC, cellular, Wimax, Wifi, etc.) as a routing request through the available wireless communications between the vehicle on-board unit 12 and the external server 18 (step S3). Upon receiving the routing request from the vehicle on-board unit 12, the external server 18 is configured to calculate one or potential travel routes from the route initialization point (e.g., the current location of the host vehicle 10 or a manually entered point) to the destination position, and to determine the historical time information or data associated with the potential travel routes based on the stored database (step S4). Then, the external server 18 is configured to send the calculated travel routes and historical time information or data associated with the potential travel routes to the vehicle on-board unit 12 through the available wireless communications (step S5).

Next in the process (step S6), a "Dynamic Navigation Route Selection" screen display is present to the user on the display 22A as seen in FIG. 6. Here, the user is preferably presented with at least two choices or options (step S7), i.e., (1) select one of the potential travel routes, or (2) view a map that pictorially displays one of the potential travel routes. Of course, it will be apparent to those skilled in the art from this disclosure that other choices or options could be provided to the user, if desired and/or needed. Also, it will be apparent to those skilled in the art from this disclosure that the information of expected travels time(s) can be presented in other ways.

In step S7, if the user wants to view a map of one of the potential travel routes before selecting a travel route, then the user touches a "MAP IT" selection button (touch screen button) next to that particular potential travel route to view the map of that potential travel route. Then, the control unit 20 pictorially displays the map for that particular potential travel route to the user on the display 22A (step S8). In particular, for example, the "Travel Route Information" screen display is presented on the display 22A as seen in FIG. 7.

However, in step S7, if the user does not want to view a map of one or more of the potential travel routes, but rather wants to immediately select the travel route, then the user touches a "Route #" selection button (touch screen button) to select that potential travel route as seen in FIG. 6. Then, the control unit 20 set that particular potential travel route as the selected travel route. At this point in time, when one of the potential travel routes has been selected as the selected travel route, the on-board navigation of the control unit 20 functions as a conventional navigation system to guide the user to the destination. In particular, for example, the screen display on the display 22A presents either a first intended maneuver of the selected travel route or a map of the selected travel route to the user on the display 22A (step S9).

Figure 7:
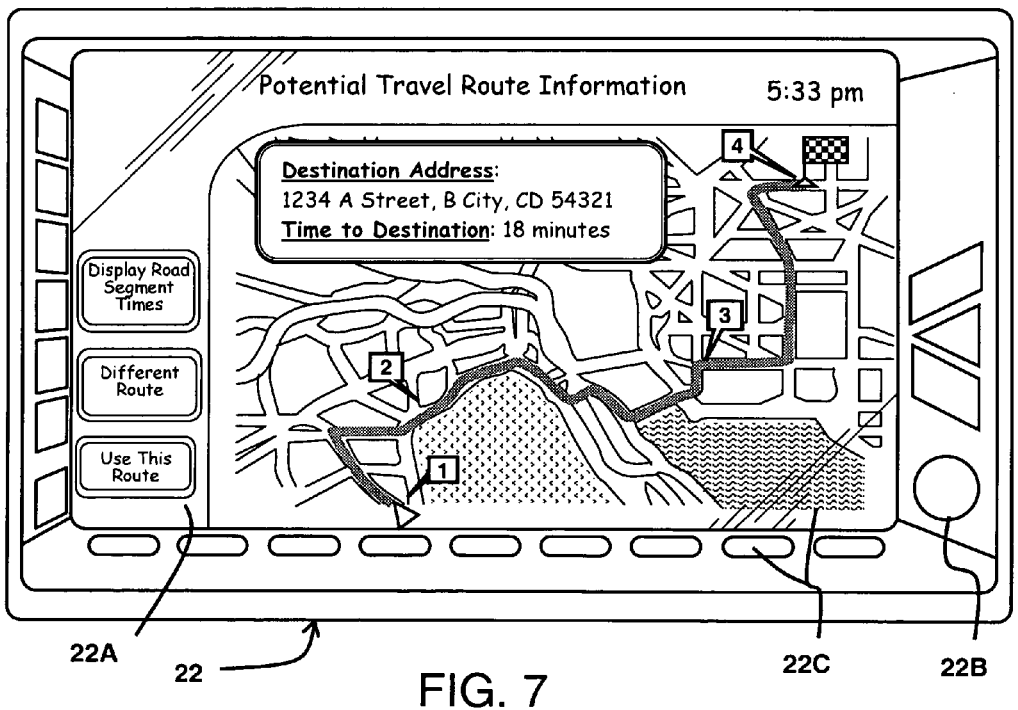
FIG. 7 is a pictorial representation of the "Travel Route Information" screen display of the human-machine interface section of the on-board unit in which one of the potential travel route is displayed as a result of depressing the "MAP IT" button in accordance with the present invention.

If the user selected to view a map of one of the potential travel routes by touching a "MAP IT" selection button in step S7, then the "Travel Route Information" screen display is presented as seen in FIG. 7 (step S8), as mentioned above. Now, the user preferably has at least three choices or options (step S10), i.e., (1) display road segment times, (2) choose a different one of the potential travel routes, or (3) select the potential travel route that is being currently viewed. Of course, other choices or options could be provided to the user, if desired and/or needed, e.g., a traffic report option could be provided as well as other options that would help the user select a route.

Figure 8:
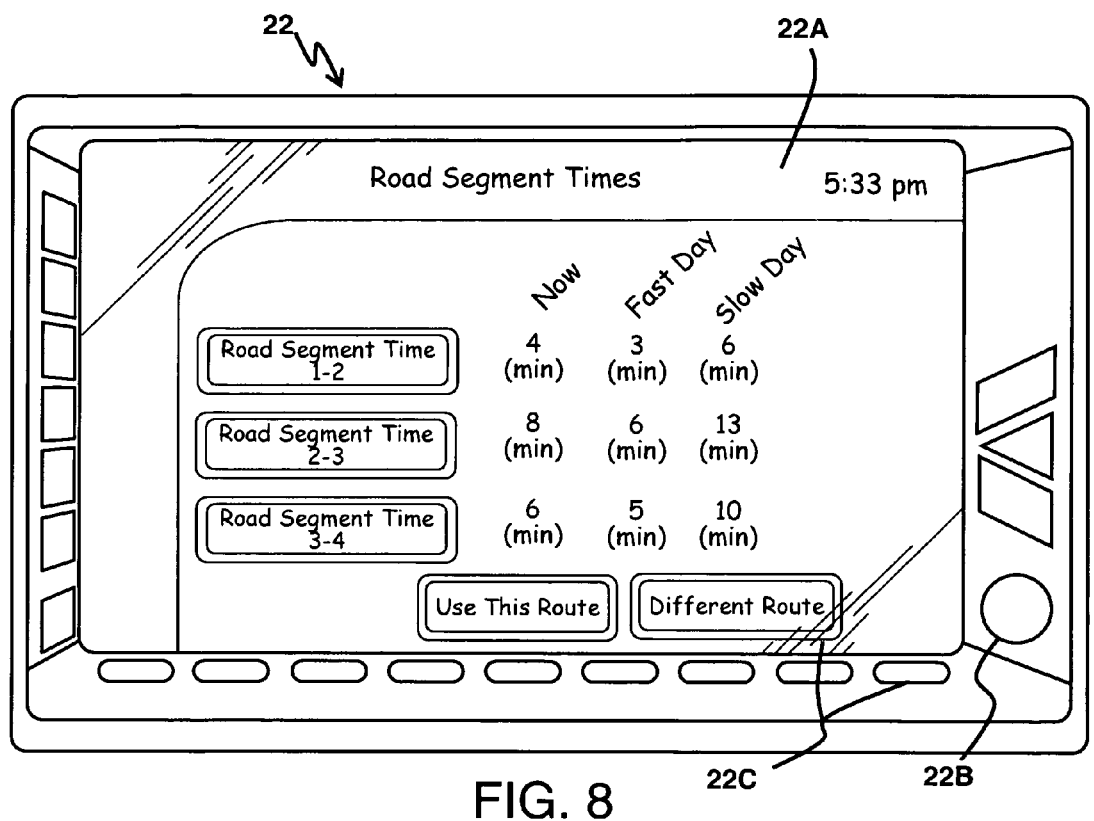
FIG. 8 is a pictorial representation of the "Road Segment Time" screen display of the human-machine interface section of the on-board unit in accordance with the present invention for a potential travel route.

In step S10, if the user wants to obtain more information about the potential travel route that is being currently viewed, then the user can optionally select to display road segment times by touching a "Display Road Segment Times" selection button (touch screen button) on the "Travel Route Information" screen display as seen in FIG. 7. Once the "Display Road Segment Times" selection button has been touched, the control unit 20 then displays road segment times for that particular potential travel route to the user on the display 22A. In particular, for example, a "Road Segment Times" screen display is presented (step S11) to the user on the display 22A as seen in FIG. 8. The "Road Segment Times" screen display presents expected travels for various road segments of the potential travel route that was previously viewed.

Now, from the "Road Segment Times" screen display, the user preferably has at least two choices or options (step S12), i.e., (1) select the potential travel route that is associated with the road segments being currently viewed, or (2) select a different travel route. Of course, other choices or options could be provided to the user, if desired and/or needed.

In step S12, if the user wants to immediately select the travel route associated with the road segment times being currently viewed, then the user touches a "Use This Route" selection button (touch screen button) select that potential travel route. Then, the control unit 20 set that particular potential travel route as the selected travel route and pictorially displays the map for that particular potential travel route to the user on the display 22A (step S9). At this point in time, when one of the potential travel routes has been selected as the selected travel route, the on-board navigation of the control unit 20 functions as a conventional navigation system to guide the user to the destination.

If the user, in step S12, touching a "Different Route" selection button on the "Road Segment Time" screen display, then the control unit 20 presents the "Dynamic Navigation Route Selection" screen display to the user on the display 22A as seen in FIG. 6. Thus, the user now has the option to select a different travel route in the manner as discussed above. The user can also quit this process at any time by selecting another option (such as pressing a "Reset Button") from the manual input controls 22C.

Thus, as can be readily seen in the screen displays of FIGS. 6 to 8, the historical time information or data is obtained by the vehicle on-board unit 12 from the external server 18 via the roadside units 16 is present to the user to provide expected travel times to aid the user in selecting a travel route. In other words, the screen display 22A and/or the audio speaker 22B (the expected travel time reporting section) of the vehicle on-board unit 12 is configured to provide the expected travel times based on the historical time information for one or more potential travel routes. In particular, for example, the travel route information section of the control unit 12 is configured to display the potential travel route(s) and the associated expected travel times for each of the potential travel routes based on the historical time information on the screen display 22A for the user to select, as seen in FIG. 6. Thus, the screen display 22A functions as the expected travel time reporting section for reporting to a user the expected travel times for each of the potential travel routes based on the historical time information.

Preferably, the external server 18 is configured to compile the actual motorist travel times and then report the expected travel times for each of the potential travel routes in the form of the statistical data to the user. For example, as seen in FIG. 6, the statistical data includes a fast expected travel time (fast day), a middle expected travel time (now) or a slow expected travel time (slow day). Thus, the external server 18 is configured to send the travel route information and the expected travel times associated with the travel route information such that the external server 18 send the middle expected times for each of the potential travel routes, the fast expected travel times for each of the potential travel routes and the slow expected travel times for each of the potential travel routes. The middle expected travel time is typically a time between the slow expected travel time and the fast expected travel time. The middle expected travel time is preferably either a median time or a mean time. Preferably, the slow expected travel time and the fast expected travel time are one or more standard deviations calculated from the historical time information based on the actual motorist travel times to navigate the various travel routes. Specifically, the fast expected travel time is at least one standard deviation less than the mean time and the slow expected travel time is at least one standard deviation more than the mean time. More preferably, the fast expected travel time is two standard deviations less than the mean time and the slow expected travel time is two standard deviations more than the mean time. Alternatively, the middle expected travel time is determined from one of the actual motorist travel times for the potential travel route, the fast expected travel time is a shorter actual motorist travel time than the middle expected travel time and the slow expected travel time is a longer actual motorist travel time than the middle expected travel time. In any event, the screen display 22A (the expected travel time reporting section) is preferably configured to report to the user at least one of the fast expected travel time, the middle expected travel time and the slow expected travel time.

As seen in FIG. 6, in the illustrated embodiment, the display unit 22A is configured to display the "Dynamic Navigation Route Selection" screen display. Various route selections and corresponding expected travel times are displayed on this screen. For example, a quickest route selection is displayed with a now time, a fast day time and a slow day time. The now time corresponds to a middle expected travel time. The fast day corresponds to a fast expected travel time and the slow day corresponds to a slow expected travel time. Accordingly, a user is able to view available routes with expected travel times based on actual motorist travel times to navigate the available routes. Once the user decides on a route, the user touches a Route # selection button to select and display the selected route on a map or display the first intended maneuver of the travel route. Of course, as mentioned above, the travel route can also be selected from other screen displays as mentioned above.

Referring back to FIG. 7, the display unit 22A is configured to display road segments in the "Travel Route Information" screen display. In these screen display, the potential travel route has been broken into road segments (three road segments shown) as indicated by points 1 to 4. From these screen display, as mentioned above, the "Road Segment Times" selection button permits the user to obtain expected travel times for each of the road segments of the potential travel route that is displayed. Thus, the display unit 22A is configured to display the road segment times or the expected travel times for each of the road segments of the potential route once the road segment times selection button has been touched.

As the host vehicle 10 with the vehicle on-board unit 12 travels along the selected route, the two-way wireless communication system 21 (the historical data input section) is configured to receive updated information from the external server 18 via the roadside units 16 during travel between a route initialization point (e.g., point 1 in FIG. 7) and the destination point (e.g., point 4 in FIG. 7). As the host vehicle 10 travels along the selected route, the expected travel times can be updated based on current travel information such as traffic information. The control unit 20 obtains the updated expected travel times from the external server 18 based on updated historical time information for the potential travel route. Thus, the display unit 22A (the expected travel time reporting section) is configured to provide the updated expected travel times to the user based on the updated historical time information. For example, while the vehicle 10 is traveling, the display screen will show the vehicle moving on the map with the estimated "Time to Destination" changing as the vehicle approaches the destination point (e.g., point 4 in FIG. 7). When updated information is received, the "Time to Destination" of FIG. 7 will be revised and the user notified of the revision via a signal, e.g., an auditory signal, a haptic signal, a visual signal and/or the like.

Referring to FIG. 8, the road segment times are displayed for the road segments of the selected route between the points 1 to 4. For example, the road segment times for each of the road segments of the selected route are illustrated in this screen display. Specifically, a middle expected travel time, a fast expected travel time and a slow expected travel time are displayed for each of the road segments of the selected route. As the host vehicle 10 travels along the selected route, the road segment times of the selected route are updated based on current travel information such as traffic information.

Thus, preferably, the potential travel routes are broken into road segments with each of the road segments having a fast expected travel time (fast day), a middle expected travel time (now) or a slow expected travel time (slow day). In other words, the external server 18 is configured to compile the actual motorist travel times and then report the expected travel times as historical time information for each road segments of the potential travel routes between a route initialization point and the destination point.

In the preferred embodiment, the external server 18 is configured to compile the actual motorist travel times for particular times of day, e.g., morning rush hour, non-rush hour, evening rush hour, holiday times, etc. Thus, the expected travel times (fast, slow, middle) of the historical time information are time sensitive based on a time of day that the potential travel route is to be traveled. In the illustrated embodiment, all expected travel times are "evening rush hour" times since the travel route information is being requested at "5:33 pm" on a weekday. In other words, the expected travel times being presented are based on actual motorist travel times from "evening rush hour" on a weekday.

Although the vehicle navigation system utilizes the off-board dynamic navigation system using the external server 18 as the navigation server in the embodiment described above, the present invention is not limited to such arrangement. More specifically, the host vehicle 10 can use the conventional on-board navigation system with route guiding function and the stored map data instead of receiving map and route information from the off-board navigation system. In such case, the vehicle on-board unit 12 preferably sends the travel route calculated by the on-board navigation system to the external server 18 via wireless communications, and the external server 18 preferably determines and sends the historical time information associated with the travel route received from the vehicle on-board unit 12. The remaining processing will be the same as the processing as explained above.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A vehicle navigation system comprising:
    a destination input section configured to enter a destination point,
    a travel route information section configured to provide at least two different potential travel routes from a location to the destination point;
    a historical data input section configured to provide historical time information based on a plurality of actual motorist travel times to navigate various travel routes;
    an expected travel time reporting section configured to report a plurality of expected travel times with respect to a single departure time based on the historical time information for each of the different potential travel routes, the expected travel time reporting section being further configured to report the plurality of the expected travel times for each of the different potential travel routes all at once for selection of one of the different potential travel routes by a user; and
    a user input receiving section configured to receive an input command from the user for selection of one of the different potential travel routes reported by the expected travel time reporting section.

2. The vehicle navigation system according to claim 1, wherein
    the historical data input section includes a wireless communication device for receiving the historical time information from an external source.

3. The vehicle navigation system according to claim 1, wherein
    the expected travel time reporting section is further configured to report statistical data to the user including a middle expected travel time determined from the actual motorist travel times for the potential travel routes as one of the expected travel times for the potential travel routes.

4. The vehicle navigation system according to claim 3, wherein
    the expected travel time reporting section is further configured to report a median time of the actual motorist travel times as the middle expected travel time.

5. The vehicle navigation system according to claim 3, wherein
    the expected travel time reporting section is further configured to report a mean time of the actual motorist travel times as the middle expected travel time.

6. The vehicle navigation system according to claim 5, wherein
    the expected travel time reporting section is further configured to report a fast expected travel time that is at least one standard deviation less than the mean time and a slow expected travel time that is at least one standard deviation more than the mean time.

7. The vehicle navigation system according to claim 1, wherein
    the historical data input section is further configured to provide the historical time information for a plurality of travel segments between a route initialization point and the destination point, and
    the expected travel time reporting section is further configured to report to the user the expected travel times for each of the travel segments.

8. The vehicle navigation system according to claim 1, wherein
the expected travel time reporting section includes a display unit configured to display the plurality of the expected travel times for each of the different potential travel routes.

9. The vehicle navigation system according to claim 1, wherein
the expected travel time reporting section is further configured to report a middle expected travel time determined from the actual motorist travel times for the potential travel routes, a fast expected travel time that is shorter than the middle expected travel time for the potential travel routes, and a slow expected travel time that is longer than the middle expected travel time for the potential travel routes.

10. The vehicle navigation system according to claim 1, wherein
the historical data input section is further configured to receive updated information during travel between a route initialization point and the destination point, and
the expected travel time reporting section is configured to provide updated expected travel times to the user based on the updated information.

11. A vehicle navigation system comprising:
a destination input section configured to enter a destination point;
a travel route information section configured to provide at least two potential different travel routes to the destination point;
a historical data input section configured to provide historical time information based on a plurality of actual motorist travel times to navigate various travel routes; and
an expected travel time reporting section configured to report to a user an expected travel time with respect to a single departure time based on the historical time information for each of the different travel routes, the expected travel time reporting section being further configured to report a middle expected travel time with respect to the single departure time determined from the actual motorist travel times for each of the potential travel routes, a fast expected travel time with respect to the single departure time that is shorter than the middle expected travel time for each of the potential travel routes, and a slow expected travel time with respect to the single departure time that is longer than the middle expected travel time for each of the potential travel routes.

12. A vehicle navigation system comprising:
a destination input section configured to enter a destination point,
a travel route information section configured to provide at least two different potential travel routes from a location to the destination point;
a historical data input section configured to provide historical time information based on a plurality of actual motorist travel times to navigate various travel routes;
an expected travel time reporting section configured to report a plurality of expected travel times with respect to a single departure time based on the historical time information for each of the different potential travel routes, the expected travel times including an actual motorist travel time that is based on a single recorded actual motorist travel time and a statistical travel time that is based on a composite of at least two actual motorist travel times, the expected travel time reporting section being further configured to report the plurality of the expected travel times for each of the different potential travel routes all at once for selection of one of the different potential travel routes by a user; and
a user input receiving section configured to receive an input command from the user for selection of one of the different potential travel routes reported by the expected travel time reporting section.

13. The vehicle navigation system according to claim 12, wherein
the historical data input section includes a wireless communication device for receiving the historical time information from an external source.

14. The vehicle navigation system according to claim 12, wherein
the expected travel time reporting section is further configured to report statistical data to the user including a middle expected travel time determined from the actual motorist travel times for the potential travel routes as one of the expected travel times for the potential travel routes.

15. The vehicle navigation system according to claim 14, wherein
the expected travel time reporting section is further configured to report a median time of the actual motorist travel times as the middle expected travel time.

16. The vehicle navigation system according to claim 14, wherein
the expected travel time reporting section is further configured to report a mean time of the actual motorist travel times as the middle expected travel time.

17. The vehicle navigation system according to claim 16, wherein
the expected travel time reporting section is further configured to report a fast expected travel time that is at least one standard deviation less than the mean time and a slow expected travel time that is at least one standard deviation more than the mean time.

18. The vehicle navigation system according to claim 12, wherein
the historical data input section is further configured to provide the historical time information for a plurality of travel segments between a route initialization point and the destination point, and
the expected travel time reporting section is further configured to report to the user the expected travel times for each of the travel segments.

19. The vehicle navigation system according to claim 12, wherein
the expected travel time reporting section includes a display unit configured to display the plurality of the expected travel times for each of the different potential travel routes.

20. The vehicle navigation system according to claim 12, wherein
the expected travel time reporting section is further configured to report a middle expected travel time determined from the actual motorist travel times for the potential travel routes, a fast expected travel time that is shorter than the middle expected travel time for the potential travel routes, and a slow expected travel time that is longer than the middle expected travel time for the potential travel routes.

* * * * *